Sept. 28, 1965  L. A. MADDEN  3,208,765

VEHICLE OVERLOAD SUPPORTING DEVICE

Filed May 9, 1963  2 Sheets-Sheet 1

INVENTOR.
LEM A. MADDEN
BY
Dunlap Laney & Hubbard
ATTORNEYS

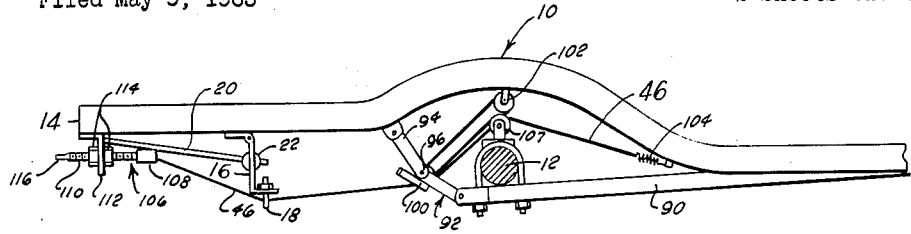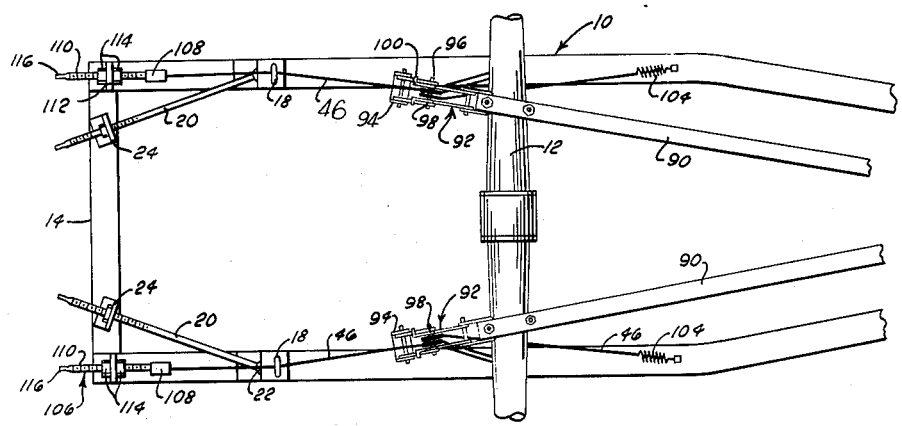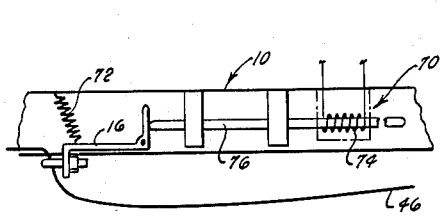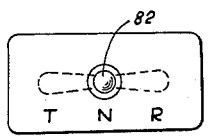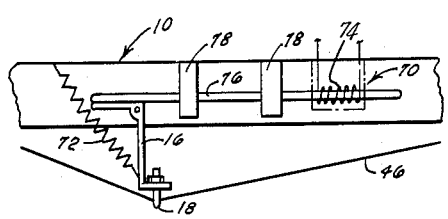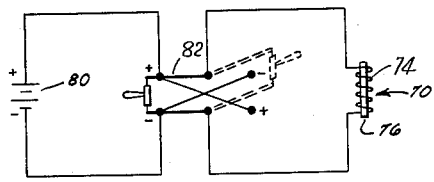

United States Patent Office 3,208,765
Patented Sept. 28, 1965

3,208,765
VEHICLE OVERLOAD SUPPORTING DEVICE
Lemuel A. Madden, 4605 S. Melrose Drive,
Oklahoma City, Okla.
Filed May 9, 1963, Ser. No. 279,145
11 Claims. (Cl. 280—124)

This invention relates to an overload supporting device for use upon four-wheeled vehicles, such as automobiles, trucks and the like, for the purpose of relieving the springs of the vehicle from excessive loading when very heavy loads are carried by the vehicle. More particularly, the present invention relates to overload supporting devices for use upon four-wheeled vehicles, which overload supporting devices are of the type comprising elongated, flexible members used to supplement or replace coil springs or leaf springs at times when the load carried by the vehicle is excessive in terms of the rated or intended capacity of such springs, or is unevenly distributed on the body of the vehicle.

In my co-pending application for United States Letters Patent, Serial Number 144,401, entitled "Combination Trailer Hitch and Overload Supporting Device," filed October 11, 1961, now U. S. Patent No. 3,093,393, of which the present application is a continuation-in-part, I have described apparatus which may be utilized for providing enhanced or increased support for the frame of a four-wheeled vehicle which is excessively loaded. The overload device described in said application includes in its structure at least one flexible load-carrying member which is extended over the rear axle of such vehicles in such a way that the flexible load-carrying member receives a portion or all of the load which is imposed upon the rear end of the vehicle and thus effectively relieves the rear springs of the vehicle from the detrimental influence of such load. The flexible load-carrying member, in a preferred embodiment of the invention described in such application, comprises a rope-core cable having a certain amount of resiliency. Suitable means for adjusting the tension in the cable is provided, and in the illustrated embodiment of the invention depicted and described in said application, constitutes a turnbuckle interposed between the ends of the flexible load-carrying member.

Although the overload supporting device described in the cited application is a highly useful apparatus and is effective to prevent overloading of the springs normally provided in such vehicles, the turnbuckle means which is provided for tensioning the overload supporting device is rather inaccessibly located and presents some inconvenience in adjusting the tension in the flexible load-carrying member preparatory to using such member for supporting the load imposed thereon.

It is proposed by the present application to improve the overload supporting device disclosed in my co-pending application by the incorporation therein of improved means for adjusting the tension in the flexible load-carrying member or members which are employed. It is further proposed to improve in certain respects the manner in which the flexible load-carrying members are attached to the frame of the vehicle and are positioned relative to the rear axle thereof so that improved load-carrying efficiency is achieved through the use of the present invention. The manner in which the flexible load-carrying member is attached and positioned relative to the vehicle frame, the axle and the rear springs of the vehicle prevents premature fatiguing and structural failure of the vehicle frame under excessive and/or disproportionate loading.

In one of its broader aspects, the present invention comprises an overload supporting device which comprises at least one flexible load-carrying member extending across the rear axle of a four-wheeled vehicle and having portions on each side of the rear axle of the vehicle passing through points which are located in a plane lying beneath the horizontal plane occupied by the upper surface of the rear axle of the vehicle. An adjustable tensioning means is provided for removing slack from the flexible load-carrying member by biasing a bight of the flexible load-carrying member in a direction tending to stretch or lengthen the load-carrying member.

The tensioning means which is employed in the overload supporting device of the invention comprises a lever-type tensioning device in which the flexible load-carrying members are tensioned through the application of manual or electrically powered leverage. From a slacked position in which the flexible, load-carrying members are relaxed and do not carry any of the load imposed upon the vehicle, the lever-type tensioning device of the invention may be utilized to quickly and rapidly remove all of the slack from the load-carrying members and place these members in tension prior to the imposition of a load thereon. In addition to the lever-type tensioning device of the invention, a supplementary or auxiliary adjustable tensioning device which permits fine or relatively small adjustments to be made in the tension of the flexible, load-carrying members is provided.

Both the lever-type tensioning device and the auxiliary adjustable tensioning device are located relative to the frame and body of the vehicle to which the load-carrying device of the invention is applied so that the tensioning devices may be operated without inconvenience by persons standing adjacent the rear of the vehicle. In the case of both the lever-type and auxiliary tensioning devices, therefore, the adjustment of the tension in the flexible load-carrying members of the invention is much more easily accomplished than in the overload supporting device depicted and described in the co-pending application hereinbefore cited, and the overall operating of the overload supporting device of this invention is thereby improved. Also, as previously indicated, the manner in which the flexible, load-carrying members are positioned relative to the axle and frame of the vehicle assures a more even distribution of heavy loads along the length of the frame and the avoidance of buckling or warping of the frame. The flexible, load-carrying members employed preferably comprise nylon ropes or lines, or rubber shock cords, although flexible cables of various constructions, including rope-core cables of the type described in the cited co-pending application may be employed.

From the foregoing description, it will be apparent that a major object of the present invention is to provide an improved overload support device for use upon four-wheeled vehicles of the type having an elongated frame and front and rear axles spaced longitudinally from each other along said frame.

A further object of the invention is to provide an elongated, flexible load-carrying member for use as an overload supporting device upon a four-wheeled vehicle, or upon a two-wheeled vehicle towed by another vehicle, which elongated, flexible load-carrying member is attached to the frame of the vehicle and positioned relative to the axle and springs of the vehicle in such way that an excessive load imposed upon the vehicle is more evenly distributed over the frame thereof.

A further object of the present invention is to provide an elongated, flexible load-carrying member which is utilized as an overload supporting device in a four-wheeled vehicle, which member is attached to the frame of the vehicle so as to improve the response of the springs thereof to flexing and recovery as the vehicle traverses rough terrain.

Another object of the present invention is to provide an improvement in the means provided for tensioning an overload supporting device of the type comprising an elongated, flexible load-carrying member which is extended over the rear axle of the vehicle and attached to the frame on opposite sides of the rear axle thereof.

Another object of the invention is to provide an overload supporting device for use upon four-wheeled vehicles, which overload supporting device is relatively inexpensive to construct and is characterized by a long and trouble-free operating life.

In addition to the foregoing objects and advantages of the invention, additional objects will become apparent as the following detailed description of the invention is read in conjunction with the accompanying drawings which illustrate my invention.

In the drawings:

FIGURE 7 is a view similar to FIGURE 1 and illustrating a modified embodiment of the overload supporting device of the invention, which modified embodiment is particularly well-adapted for use upon vehicles having lighter or structurally weaker frames.

FIGURE 8 is a plan view of the modified overload supporting device shown in FIGURE 7 as the same is viewed from beneath the frame of the vehicle.

FIGURES 9 and 10 are detail views of a modified embodiment of the lever-type tensioning means used to remove the slack from, and induce tension in, the flexible load-carrying member of the overload supporting device of the invention.

FIGURE 11 is an electrical circuit diagram illustrating the electrical circuitry employed for the operation of the tensioning means illustrated in FIGURES 9 and 10.

FIGURE 12 is a view in elevation of the arrangement on the vehicle dash panel of the switch utilized in the electrical circuitry of FIGURE 10.

Figure 1:
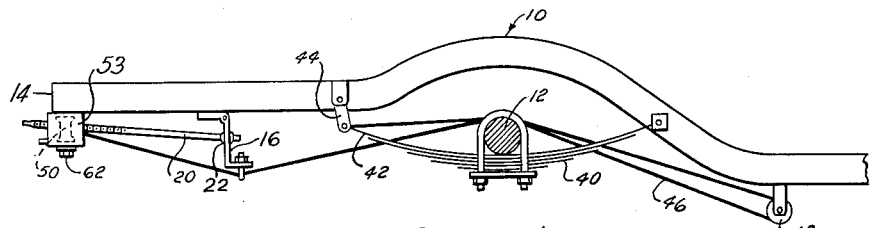
FIGURE 1 is a view in elevation of the frame of a vehicle to which is attached one embodiment of the overload supporting device of the present invention. The rear axle of the vehicle is shown in section.

Referring now to the drawings in detail, and particularly, to FIGURES 1 through 5, the generally rectangular frame of a four-wheeled vehicle, such as an automobile, truck or the like, is designated generally by reference character 10. In vehicles of the type described, the frame 10 generally has an arcuate or bowed portion spaced forwardly of the rear end thereof for the accommodation of the rear axle 12 of the vehicle. However, such bowing of the frame is not required for the utilization of the present invention. Moreover, it is also possible to apply the present invention to the front axles of four-wheeled vehicles and to the single axles of trailers or other towed vehicles which are supported at their forward ends by a trailer hitch or the like. For purposes of illustration, however, the invention will be described as it is applied to the rear axle of a four-wheeled vehicle such as an automobile or truck.

Intermediate the rear end 14 of the frame 10 and the rear axle 12 a pair of downwardly depending compression members 16 are provided and are pivotally connected at their upper ends to the frame 10 on opposite sides thereof. At the lower end of each of the compression members 16, an eye member 18 is provided to receive the elongated, flexible, load-carrying members of the overload support device in the manner hereinafter described.

Figure 2:
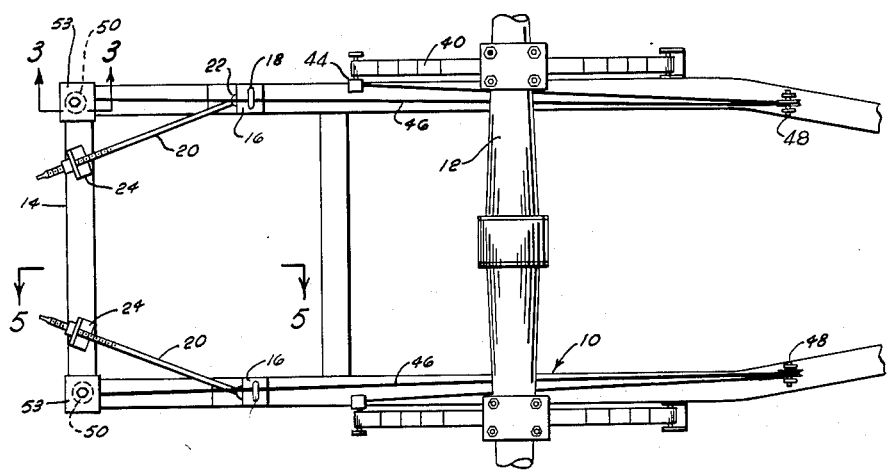
FIGURE 2 is a plan view of the overload supporting device, vehicle frame and axle illustrated in FIGURE 1 as these elements appear when viewed from beneath the vehicle.
Figure 5:
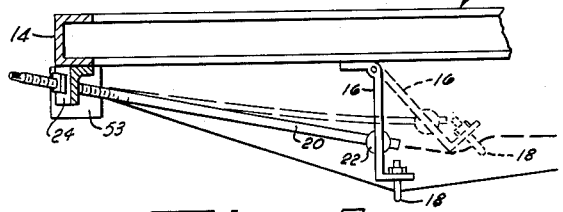
FIGURE 5 is a view in section taken along line 5—5 of FIGURE 2.

An elongated actuating rod 20 is connected through a ball and socket joint 22 to each of the compression members 16 and extends rearwardly therefrom beneath the frame 10. Adjacent the rear end 14 of the frame 10, the rear ends of the elongated actuating rods 20 pass through a pair of threaded brackets 24 secured to the lower side of the frame as illustrated in FIGURE 2. The rear ends of the elongated actuating rods 20 are relieved so as to permit the engagement therewith of a wrench or other suitable tool for rotating the actuating bar to thread it forward through the threaded brackets 24. The elongated actuating bars are sufficiently flexible to permit them to be slightly bowed and thereby placed in tension when the bars are threaded forward in the brackets 24 to bias the compression members 16 to their forward, retracted position as shown in FIGURE 5.

As is well-known in the art, the normal load which is to be carried by the vehicle is supported upon the axles thereof through the instrumentality of leaf or coil springs. In the leaf spring arrangement, a pair of leaf springs 40 are passed under and secured to the rear axle 12 at opposite sides of the frame and are each connected at their opposite ends to the frame in the manner shown in FIGURE 1. The rear end 42 of each spring 40 is connected to the frame 10 through a suitable shackle 44 which is pivotally attached to the frame.

In accordance with the teaching of the present invention, elongated, flexible, load-carrying members 46 are secured at one of their ends to each of the pivoted shackles 44, are passed over the top of the rear axle 12 and are reeved above sheaves 48 which are positioned well forward of the axle 12 on the frame 10. One of the elongated, flexible, load-carrying members 46 is provided on each side of the frame 10 as shown in FIGURE 2. After passing through the sheaves 48, the flexible, load-carrying members 46 are passed back across the top of the axle 12, through the eye members 18 at the lower ends of the compression members 16, and from thence to the rear end 14 of the frame 10 at each side thereof. At the rear end 14 of the frame 10, each of the elongated, flexible, load-carrying members 46 is connected to a capstan designated generally by reference character 50 which is rotatably journalled in channel-shaped brackets 53 secured to the corners of the frame.

The capstans 50 each comprise a smooth-surfaced, cylindrical barrel 51, a shaft 52 which is rotatably journalled in the brackets 53, and a ratchet member 54, which, with the barrel 51, is keyed to the shaft 52 for rotation therewith. A pawl 56 is pivotally secured to the frame 10 in a position to be biased into engagement with the ratchet member 54 by a suitable spring 58. One end of the pawl 56 projects rearwardly from the rear end 14 of the frame 10, thereby facilitating manual pivotation of the pawl out of engagement with the ratchet member 54.

Figure 3:
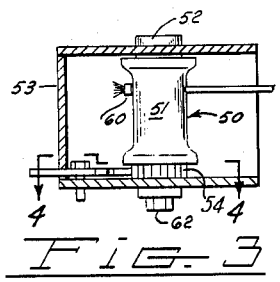
FIGURE 3 is a vertical sectional view taken along line 3—3 of FIGURE 2.

An aperture is diametrically formed through the smooth-walled, cylindrical barrel of each of the capstans 50, and one end of the elongated, flexible, load-carrying members 46 is passed therethrough in the manner shown in FIGURE 3. A clamp or stopper 60 is secured around the ends of the load-carrying members 46 to prevent them from being pulled free of the capstans. To facilitate the rotation of the capstans 50 to permit the tension in the elongated, flexible, load-carrying members 46 to be increased, the lower ends of the shafts 52 are provided with a relieved and preferably hexagonal end portion 62 which permits a suitable wrench or other tool to be utilized to rotate the capstan. In a preferred construction of the invention, the ends of the elongated actuating rods 20 and the relieved ends of the shafts 52 are identically dimensioned so that the same tool may be used to engage both of these elements.

It will be noted in referring to the foregoing description and to FIGURE 1 of the drawings that the load-carrying members 46 are passed over the upper surface of the rear axle 12 in such a way that an angle of less than 180° is defined by the spans of the load-carrying members located on opposite sides of the axle. Stated differently, each of the load-carrying members passes through points which lie in a plane which passes beneath the upper surface of the rear axle 12. This arrangement is essential to the effective functioning of the overload supporting device of the invention in the manner hereinafter described.

Although many of the benefits of the invention may be derived from the use of a number of types of elongated, flexible, load-carrying members 46, a preferred construction of the invention contemplates the use of heavy nylon rope or line for these members, or the use of heavy rubber shock cords. Nylon has sufficiently high tensile strength to carry the excessive loads which it is normally the purpose of the overload supporting device to support, and additionally, has a degree of resiliency whch permits it to give a softer and more comfortable ride in the vehicle than can be achieved when cables, chains or hemp ropes are employed. Moreover, the nylon lines which constitute the preferred load-carrying members of the invention are less expensive than steel cables and have considerably greater load-carrying capacity than hemp ropes of comparable diameter. Also, adjustment of the tension in the nylon load-carrying members may be much more easily accomplished using the ratchet type tension adjusting means hereinbefore described than can be achieved when a steel cable is employed. Finally, the nylon ropes have an inherent lubricity which enables them to slide more easily and with less wearing effect over the axle 12.

In the operation of the embodiment of the invention illustrated in FIGURES 1 through 5, the overload supporting device is first secured to the frame of the vehicle in the manner specified. At times when the vehicle is not excessively loaded or is not disproportionately loaded so as to impose considerably more weight upon one side of the frame than the other, the flexible load-carrying members 46 are slacked and do not receive any of the load imposed upon the vehicle. In this event, of course, the leaf springs 40 transmit the entire load of the vehicle from the frame 10 to the axle 12. In order to maintain the load-carrying members 46 in their slacked status and to prevent them from contacting the axle 12 and thereby being worn by friction, the elongated actuating rods 20 are cranked forwardly to pivot the compression members 16 to a retracted, forwardly extending position. This position of the compression members 16 and rods 20 is illustrated in dashed lines in FIGURE 5.

When the vehicle is to be loaded in excess of the rated capacity, the downwardly depending compression members 16 are moved downwardly into a substantially vertical position by withdrawing the elongated actuating rods 20 toward the rear of the vehicle. This, of course, is accomplished by engaging the ends of the rods with a suitable tool and threading the rods rearwardly through the brackets 24. As the compression members 16 move into their downwardly extending positions, the slack is removed from the load-carrying members 46 and a slight tension is imposed thereon. The load is then placed upon the vehicle and the ratchet members 54 are manipulated to wind the flexible, load-carrying members 46 upon the smooth-surfaced, cylindrical barrels 51 of the capstans 50. In this way, the tension in the load-carrying members 46 may be adjusted as desired. In the event that a greater proportion of the load is imposed upon one side of the frame 10 than the other, the greater amount of tension and therefore support may be provided in the load-carrying member 46 on the overloaded side of the vehicle by suitable adjustment of the appropriate ratchet member 54.

As the load-carrying members 46 are placed in tension, the leaf springs 40 tend to be bowed to a slightly greater extent and thus offset or compensated against the flattening and fatiguing effect of over-loading. The springs are therefore rendered more effective in reducing or relieving the vehicle from sudden shocks and jolts when the elongated, flexible, load-carrying members 46 serve to carry a substantial portion of the excessive load which is imposed on the vehicle.

Figure 6:
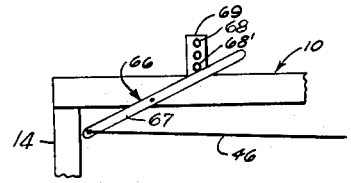
FIGURE 6 is an illustration of an alternate embodiment of the adjustable auxiliary tensioning means which is used in the overload supporting device of the present invention.
Figure 4:
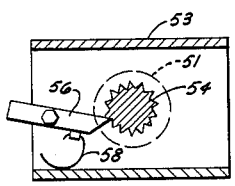
FIGURE 4 is a view in section taken along line 4—4 of FIGURE 3.

In some instances, particularly where the less flexible type of load-carrying member, such as steel cables are employed, it may be desirable to replace the ratchet members 54 and their associated pawls 56 with lever-type tensioning adjusting devices, such as that designated by reference character 66 in FIGURE 6. The lever-type tension adjusting devices 66 comprise an elongated shaft or rod 67 which is pivotally secured to the frame 10 on the lower side thereof and adjacent the rear end 14 thereof. The pivot point of the rod 67 is positioned more nearly adjacent one end of the rod which is connected to the rear end of the respective load-carrying member 46. A plurality of apertures 68 are formed in a transverse line across a plate 69 attached to the frame 10 and receive a retaining pin (not seen) which may be dropped through the apertures from the upper side of the plate.

In the operation of the lever-type tension adjusting device 66 shown in FIGURE 6, the rod 67 is pivoted toward the forward end of the frame 10 to tension the flexible, load-carrying members 46, and the extent to which the load-carrying members 46 are tensioned will be determined by the final position of the rod 67. The final position of the rod 67 will in turn be determined by the particular position in which it is retained by selective use of the apertures 68 and their associated pins 68'. The use of the lever-type tension adjusting device 66 presents several advantages in use over the ratchet and pawl system disclosed in FIGURES 1 through 4. Thus, it does not require a tool for manipulation, it is considerably more economically constructed, and it is more rapidly adjusted than the ratchet and pawl arrangement. On the other hand, the lever-type tension device 66 does not permit as great a degree of selectivity in tension adjustment as does the pawl and ratchet arrangement heretofore described.

A modified system for actuating the compression members 16 for the purpose of removing the slack from the load-carrying members 46 is illustrated in FIGURES 9, 10 and 11. In the modified system illustrated in these figures, the compression members 16 which are employed to remove slack from the load-carrying members 46 are pivotally secured to the flat inside surface of the frame 10 and are actuated by an electrical solenoid designated generally by reference character 70. The compression member 16 is biased by a suitable spring 72 to a retracted position as shown in FIGURE 9.

When it is desired to pivot the compression member 16 into its tensioning position, the coil 74 of the solenoid 70 is energized to extend the elongated core or armature 76. The armature 76 thereupon pivots the compression member 16 downwardly, extending the spring 72 and placing the load-carrying member 46 in tension as shown in FIGURE 10. The armature 76 is slidably supported in a pair of brackets 78 which are secured to the side of the frame 10. Once the armature 76 of the solenoid 70 has been extended to the position shown in FIGURE 10, the current to the coil 74 of the solenoid 70 may be stopped by opening a suitable switch so that the compression member 16 is retained in its downwardly extending, tensioning position. When it is desired to permit the compression member 16 to return to its retracted position, the direction of current flow through the coil 74 is reversed to effect a retraction of the armature 76 of the solenoid 70. The spring 72 then functions to bias the compression member 16 to its retracted position as shown in FIGURE 9.

Simple electrical circuitry which may be employed to actuate the solenoid 70 in the manner described is illustrated in FIGURE 11 of the drawings. A source of electromotive force 80 is connected through a polarity reversing switch 82 to the coil 74 of the solenoid 70. It will be perceived in referirng to FIGURE 11 that two positions of closure of the switch 82 exists which permit the direction of current flow in the coil 70 to be reversed as desired. In this manner, the armature 76 of the solenoid 70 may be extended and retracted by consecutively moving the switch to its two alternate positions of closure. When the switch is in its intermediate position so that the circuit is open, the armature 76 will remain in the position to which it has last been moved by energization of the coil 74.

The arrangement depicted in FIGURES 9 through 11 and hereinbefore described for electrically actuating the pivoted compression members 16 is particularly useful since the compression members 16 may be placed in their tensioning or non-tensioning position as desired by manipulation of the switch 82 which may be conveniently located upon the dash panel of the vehicle as shown in FIGURE 12. In FIGURE 12, the switch 82 is shown in its neutral or circuit breaking position. The tensioning position of the switch is indicated by the letter T and the retracting position of the switch by the letter R. Thus, as the switch 82 is moved to the left, the armature 76 of the solenoid 70 will be extended to pivot the compression members 16 into their tensioning position. Movement of the switch 82 to the right will withdraw the armature 76 into the coil 74 so that the compression members 16 can be retracted by the springs 72.

A different embodiment of the present invention is illustrated in FIGURES 7 and 8 of the drawings. Insofar as the manner in which the flexible, load-carrying members 46 are attached to the frame 10 of the vehicle and are arranged relative to the axle 12 thereof, the embodiment of the invention shown in these figures is intended to provide especially effective overload support in certain types of vehicles which are presently constructed with relatively light and therefore mechanically weak frames. These types of frames frequently have a pair of struts 90 which converge toward each other well forward of the rear axle 12, and which are connected at their rear or after ends to the rear axle in the manner shown in FIGURES 7 and 8.

In light frames of the type where the struts 90 are provided, the present invention takes the form of a pair of connecting members 92 which are each pivotally connected at their upper ends 94 to the frame 10 at points spaced to the rear of the rear axle 12. The lower end of each of the connecting members 92 is pivotally connected to one of the struts 90. It will be apparent in referring to FIGURE 8 that one of the connecting members 92 is provided on each side of the vehicle. Each connecting member 92 comprises a pair of segments which are pivotally connected to each other in end-to-end relation through an elbow joint 96 so that the distance between the ends of the connecting member 92 may be varied by pivoting the segments of the connecting member about the elbow joint 96. The pivot pin of the elbow joint 96 passes through a pair of sheaves 98 which are rotatably mounted on the pivot pin. A stop member 100 is secured to one of the segments of each of the connecting members 92 and extends past the elbow joint 96 so as to prevent the pivotation of the segments of the connecting members 92 to a position in which they define an angle opening toward the rear of the frame. In other words, the distance between the ends of the connecting member 92 may be reduced only by moving the elbow joint 96 downwardly and toward the rear 14 of the frame 10.

In the case of frames which are not provided with the struts 90, the lower ends of the connecting members 92 may be suitably secured for pivotal movement directly to the rear axle 12.

Another sheave 102 is rotatably secured to the frame 10 and spaced well forward of each of the connecting members 92 on each side of the frame 10. Preferably, the sheaves 102 are positioned even with, or slightly forward of, the rear axle 12 on the frame 10. A pair of elongated, flexible load-carrying members 46 are connected through springs 104 at one of their ends to the frame 10 of the vehicle at points well forward of the rear axle 12 and the sheaves 102. From its point of connection to the spring 104, each load-carrying member 46 extends across the top of the axle 12 around one of the sheaves 98 carried by one of the connecting members 92, around one of the sheaves 102, under the second sheave 98 carried by the respective connecting member 92, through the eye 18 at the bottom of one of the compression members 16 and to an auxiliary tension adjusting means designated generally by reference character 106 located at the rear end 14 of the frame 10. Instead of the load-carrying members passing over the upper surface of the rear axle 12 in direct contact therewith, suitable sheaves 107 may be rigidly secured to the rear axle and may receive the load-carrying members 46 to prevent excessive frictional wear of the load-carrying members as they move across the top of the axle.

The two auxiliary tension adjusting means 106 located at the rear 14 of the frame 10 each comprise a clamp 108 which is secured to a threaded rod 110, and which firmly grips and retains the end of the load-carrying member 46. The threaded rod 110 passes through a bracket 112 secured to the frame 10 adjacent one of the rear corners thereof. A pair of locknuts 114 are provided for retaining the threaded rod 110 in a desired position relative to the bracket 112. The ends 116 of the threaded members 110 which protrude rearwardly from the frame 10 are relieved to permit the threaded member to be actuated by a suitable tool.

In the embodiment of the invention illustrated in FIGURES 7 and 8, the same mechanism is provided for pivoting the compression members 16 relative to the frame 10 as is provided for this purpose in the embodiment illustrated in FIGURES 1, 2 and 5 of the drawings. It will be apparent that the electrical solenoid actuation system illustrated in FIGURES 9 and 10 may alternatively be employed if desired.

In the operation of the embodiment of the invention illustrated in FIGURES 7 and 8, the compression members 16 on each side of the frame 10 are pivoted to their downwardly projecting positions relative to the frame by actuation of the actuating rods 20 in the manner hereinbefore described. This movement of the compression members 16 removes the slack from the load-carrying members 46 and places these members in tension. The excessive load which it is desired to carry may then be imposed upon the frame 10 of the vehicle and the proportion of this load which is carried by the load-carrying members 46 may then be adjusted by adjusting the threaded members 110 of the auxiliary tension adjusting devices 106.

It has previously been indicated that the embodiment of the invention illustrated in FIGURES 7 and 8 is well-adapted for use upon vehicles having relatively light and structurally less rigid frames. In vehicles of this type, a heavy and excessive load placed toward the rear of the frame 10 will, in a relatively short time, cause the frame to buckle or become warped by bending the rear portion of the frame downwardly and buckling the portion of the frame over the axle upwardly. Actual structural failure of such frames has been known to occur as a result of this type of warping or bending action.

The present invention, in addition to its function of relieving the coil or leaf springs of the vehicle from excessive loading and permitting heavier loads to be carried thereby, also functions to more evenly distribute the forces acting upon the frame so as to avoid buckling or warping of the type described. In referring to FIGURES 7 and 8 of the drawings, it will be perceived that, as the load-carrying members 46 are placed in tension, a downward force is impressed upon the frame 10 at the point of connection thereto of the sheaves 102. An upward force is impressed upon the frame at the point of connection thereto of the connecting members 92 as a result of the tension in the load-carrying members 46 acting to straighten out the connecting members 92 by movement of the elbow joint 96, and thereby effectively increasing the distance between the ends of the connecting members. The collective influences of the upwardly acting force applied to the frame in the vicinity of the sheaves 102 and the downwardly acting force applied to the frame in the vicinity of the connecting members 92 results in the normal configuration of the frame 10 being maintained against the force of the excessive load which tends to warp or buckle the frame.

From the foregoing description of the invention, it will be apparent that the present invention provides a useful overload supporting device which is adaptable to use upon many types of vehicles of the general type described, which device may be permanently mounted on such vehicles and which may be quickly adapted to the support of an excessive load imposed upon the vehicle. Tension adjusting means which are provided for varying the tension in the load-carrying members of the overload supporting device may be easily manipulated from convenient positions around the vehicle, and the overall construction of the device is relatively economical and installation thereof is easily effected.

Although a number of modifications and innovations in the structure hereinbefore described and depicted in the drawings by way of example will occur to those skilled in the art, unless such changes and modifications depart from a reliance upon the basic principles underlying the present invention, they are intended to be circumscribed and included within the spirit and scope of the invention except as the same may be necessarily limited by the appended claims or reasonable equivalents thereof.

I claim:

1. An overload supporting device adapted for attachment to a vehicle having a pair of horizontally spaced ground wheels, a generally horizontal axle interconnecting said ground wheels, an elongated frame extending across said axle in a direction normal thereto and a pair of leaf springs extending across said axle and connected at their opposite ends to said frame on opposite sides of said axle for transmitting the weight of said frame to said axle, said overload supporting device comprising at least one elongated, flexible, load-carrying member connected at one of its ends to one end of one of said leaf springs, said load-carrying member extending from its connected end across said axle, through a sheave secured to said frame on the opposite side of said axle, back across said axle in contact with the upper surface thereof, and having its second end connected to said frame adjacent the end thereof closest to the end of said leaf spring to which the first-mentioned end of said load-carrying member is connected, the portions of said load-carrying member extending across said axle passing over said axle in a position substantially vertically aligned with said leaf spring whereby portions of the load imposed upon said frame will be carried by both said leaf spring and the portions of said load-carrying member extending across said axle.

2. An overload supporting device as claimed in claim 1 wherein said lever tensioning means comprises:
    (a) a compression member having an upper end and a lower end and further having its upper end pivotally connected to said frame between said axle and the end of said frame to which the second end of said load-carrying member is connected and having its lower end cooperating with said load-carrying member to bias said load-carrying member into tension when said compression member is pivoted into a vertically downwardly depending position relative to said frame; and
    (b) means for pivoting said compression member on said frame.

3. An overload supporting device as claimed in claim 1 and further characterized to include lever tensioning means associated with each of said load-carrying members for placing said load-carrying members in tension upon actuation of said lever tensioning means.

4. An overload supporting device as claimed in claim 3 wherein said means for pivoting said compression member on said frame comprises:
    (a) an elongated actuating rod connected at one of its ends to said compression member; and
    (b) a bracket secured to said frame at one end thereof and threadedly receiving a medial portion of said actuating rod whereby the second end of said rod projects beyond said frame and said rod may be screwed through said bracket to pivot said compression member between tensioning and non-tensioning positions.

5. An overload supporting device as claimed in claim 3 wherein said means for pivoting said compression member on said frame comprises:
    (a) a solenoid having a coil and a movable member cooperating with said compression member to bias said compression member to a tensioning position;
    (b) a spring connected between said compression member and said frame for biasing said compression member to a non-tensioning position, and,
    (c) circuit means including a switch element connected to said solenoid and adapted to reverse the polarity of the coil of said solenoid to retract said movable member whereby said spring can bias said compression member to a non-tensioning position.

6. An overload supporting device adapted for attachment to a vehicle having a pair of horizontally spaced ground wheels, a generally horizontal axle interconnecting said ground wheels and an elongated frame extending across said axle in a direction normal thereto, said overload supporting device comprising:
    (a) a connecting member pivotally connected at one of its ends to said axle and pivotally connected at its other end to said frame at a point spaced horizontally to one side of said axle, said connecting member having an elbow joint intermediate its length to permit the distance between the ends of said connecting member to be varied;
    (b) a pair of sheaves rotatably carried by said connecting member and positioned adjacent said elbow joint;
    (c) a sheave secured to said frame and spaced in the direction of said axle therealong from the point of connection to said frame of said connecting member;
    (d) an elongated, flexible, load-carrying member connected at one of its ends to the end of said frame which is on the same side of said axle as the point at which said connecting member is connected to said frame, and connected at its other end to said frame at a point thereon spaced horizontally from said axle on the opposite side thereof from the point of connection to said frame of said connecting member, said load-carrying member passing under one of the sheaves on said connecting member, around the sheave secured to said frame, around the second sheave on said connecting member and across the upper surface of said axle; and
    (e) means for tensioning said load-carrying member.

7. An overload supporting device adapted for attachment to a vehicle having a pair of horizontally spaced ground wheels; an elongated, generally rectangular frame having two opposed sides and two opposed ends; a generally horizontal axle interconnecting said ground wheels and extending transversely across and below said frame; and a pair of leaf springs each extending across and connected intermediate their ends to said axle, and said leaf springs being further connected at one of their ends on the same side of said axle and on the opposite sides of said frame, said overload supporting device comprising:

(a) a pair of shackles pivotally connected to opposite sides of said frame on the opposite side of said axle from the ends of said leaf springs attached to said frame, said shackles being further pivotally connected to the other ends of said leaf springs;

(b) a sheave secured to each of the opposite sides of said frame and on the same side of said axle as the points of connection of said leaf springs to same frame; and, (c) elongated, flexible, load-carrying members on opposite sides of said frame and each connected at one of its ends to one of said shackles adjacent its point of connection to its respective leaf spring, each of said load-carrying members extendng from its end connected to one of said shackles across said axle, through one of said sheaves, back across said axle in contact with the upper surface thereof, and having its second end connected to said frame adjacent the end thereof closest to said shackle and on the side thereof to which are connected the sheave and shackle with which the respective load-carrying member cooperates.

8. An overload supporting device for use upon four-wheeled vehicles, such as automobiles and the like, of the type having a rear axle extending beneath the vehicle between two rear wheels of the vehicle, and having a frame extending over and across said rear axle, said device comprising:

(a) a pair of nylon ropes extending across the rear axle and spaced from each other therealong;

(b) means for securing said nylon ropes to the frame of the vehicle at opposite sides of said axle at points in a plane below the horizontal plane occupied by the upper surface of said axle;

(c) a compression member having an upper end and a lower end and further having its upper end pivotally connected to said frame between the rear axle and the rear end of said frame and its lower end cooperating with one of said nylon ropes to bias said one rope into tension when said compression member is pivoted into a vertically downwardly depending position relative to said frame; and (d) means for pivoting said compression member on said frame, said means extending to and being manually controllable from the rear of said rectangular frame.

9. An overload supporting device as claimed in claim 8 and further characterized to include (a) a capstan mounted on said frame at each of the rear corners thereof and each connected to one end of said nylon ropes; and (b) ratchet means for selectively preventing rotation of said capstans in one direction.

10. An overload supporting device for use upon four-wheeled vehicles, such as automobiles and the like, of the type having a rear axle extending beneath the vehicle between two rear wheels of the vehicle, and a generally rectangular frame extending over and across said rear axle, said device comprising:

(a) a pair of nylon ropes extending across the rear axle and spaced from each other therealong;

(b) means for securing said nylon ropes to the frame of the vehicle on opposite sides of said axle and at points in a plane below the horizontal plane occupied by the upper surface of said axle;

(c) a pair of elongated lever bars pivotally mounted on said frame adjacent the rear end thereof and each pivoted in a horizontal plane about a vertical axis passing through the respective bars at a point closer to one of the ends of the respective bar than the other end thereof to provide a fulcrum about which each of said bars can act as a lever, said nylon ropes each being attached to the end of a separate one of said lever bars, which end is nearest the pivotal axis thereof whereby the respective lever bars can be used for independently placing said ropes in tension upon actuation of said lever bars so that each side of the vehicle may be independently leveled; and (d) means for securing said lever bars against pivotation after said bars have been pivoted to a position to place said ropes in tension.

11. An overload supporting device for use upon four-wheeled vehicles, such as automobiles and the like, of the type having a rear axle extending beneath two rear wheels of the vehicle, and a generally rectangular frame extending over and across said rear axle, said device comprising:

(a) a pair of flexible, elongated load-carrying members extending across the rear axle and spaced from each other therealong;

(b) means for securing each of said flexible, elongated load-carrying members to the frame of the vehicle on opposite sides of said axle and at points in a plane below the horizontal plane occupied by the upper surface of said axle;

(c) coarse tensioning means manually controllable from the rear of the vehicle associated with each of said flexible, elongated load-carrying members for independently including slack in or placing in tension said load-carrying members upon actuation of said coarse tensioning means;

(d) a capstan mounted on said frame at each of the rear corners thereof and each connected to one end of one of said flexible, elongated load-carrying members; and (e) ratchet means for selectively preventing rotation of said capstans in one direction, said capstans and ratchet means providing a fine control of the tension in said flexible, elongated load-carrying members.

References Cited by the Examiner

UNITED STATES PATENTS

| | | | |
|---|---|---|---|
| 1,297,849 | 3/19 | Hofmann | 267—11 |
| 1,379,836 | 5/21 | Rackham | 267—2 |
| 1,404,966 | 1/22 | Johnson | 267—2 |

PHILIP ARNOLD, *Primary Examiner.*

LEO FRIAGLIA, A. HARRY LEVY, *Examiners.*